United States Patent
Liu et al.

(10) Patent No.: US 10,802,882 B2
(45) Date of Patent: Oct. 13, 2020

(54) ACCELERATING MEMORY ACCESS IN A NETWORK USING THREAD PROGRESS BASED ARBITRATION

(71) Applicant: International Business Machines Corporation, Armonk, NY (US)

(72) Inventors: Su Liu, Austin, TX (US); Jinho Lee, Austin, TX (US); Inseok Hwang, Austin, TX (US); Eric Rozner, Boulder, CO (US)

(73) Assignee: International Business Machines Corporation, Armonk, NY (US)

(*) Notice: Subject to any disclaimer, the term of this patent is extended or adjusted under 35 U.S.C. 154(b) by 117 days.

(21) Appl. No.: 16/218,734

(22) Filed: Dec. 13, 2018

(65) Prior Publication Data
US 2020/0192720 A1    Jun. 18, 2020

(51) Int. Cl.
*G06F 9/50* (2006.01)
*G06F 9/52* (2006.01)
(Continued)

(52) U.S. Cl.
CPC .......... *G06F 9/5038* (2013.01); *G06F 9/3869* (2013.01); *G06F 9/48* (2013.01);
(Continued)

(58) Field of Classification Search
CPC ... G06F 9/52; G06F 9/522; G06F 9/50; G06F 9/5038; G06F 9/48; G06F 9/4843; G06F 9/4881
See application file for complete search history.

(56) References Cited

U.S. PATENT DOCUMENTS 9,294,354 B2   3/2016   Kumar
9,977,745 B2   5/2018   Florea et al.
(Continued)

FOREIGN PATENT DOCUMENTS

GB       2541665 A      3/2017

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Charles M Swift
(74) *Attorney, Agent, or Firm* — Law Office of Jim Boice

(57) ABSTRACT

A method accelerates memory access in a network using thread progress based arbitration. A memory controller identifies a prioritized thread from multiple threads in an application. The prioritized thread reaches a synchronization barrier after the other threads due to the thread encountering more events than the other threads before reaching the barrier, where the events are from a group consisting of instruction executions, cache misses, and load/store operations in a core. The memory controller detects a cache miss by the prioritized thread during execution of the prioritized thread after the barrier is reached by the multiple threads. The memory controller then retrieves and returns data from the memory that cures the cache miss for the prioritized thread before retrieving data that cures cache misses for the other threads by applying thread progress based arbitration in the network.

20 Claims, 9 Drawing Sheets

(51) Int. Cl.
  *G06F 9/48* (2006.01)
  *G06F 9/38* (2018.01)
  *G06F 12/0815* (2016.01)
  *G06F 9/54* (2006.01)
  *G06F 12/0875* (2016.01)
  *G06F 15/78* (2006.01)

(52) U.S. Cl.
  CPC .......... *G06F 9/4843* (2013.01); *G06F 9/4881* (2013.01); *G06F 9/50* (2013.01); *G06F 9/52* (2013.01); *G06F 9/522* (2013.01); *G06F 9/542* (2013.01); *G06F 12/0815* (2013.01); *G06F 12/0875* (2013.01); *G06F 15/7825* (2013.01)

(56) References Cited

U.S. PATENT DOCUMENTS

| | | | |
|---|---|---|---|
| 2004/0128489 A1* | 7/2004 | Wang | G06F 9/544 712/235 |
| 2005/0071438 A1* | 3/2005 | Liao | G06F 9/3842 709/214 |
| 2005/0071841 A1* | 3/2005 | Hoflehner | G06F 8/441 718/100 |
| 2010/0138841 A1* | 6/2010 | Dice | G06F 9/466 718/107 |
| 2010/0299668 A1* | 11/2010 | Venkumahanti | G06F 11/3632 718/102 |
| 2012/0005457 A1* | 1/2012 | Chen | G06F 9/4843 712/207 |
| 2012/0110586 A1* | 5/2012 | Coon | G06F 9/4881 718/102 |
| 2013/0179613 A1 | 7/2013 | Boucard et al. | |
| 2015/0339173 A1* | 11/2015 | Champseix | G06F 9/522 718/102 |
| 2016/0191420 A1 | 6/2016 | Nagarajan et al. | |
| 2016/0210212 A1* | 7/2016 | Yim | G06F 11/3409 |
| 2016/0259667 A1* | 9/2016 | Bailey | G06F 9/4893 |
| 2017/0046198 A1 | 2/2017 | Solihin | |
| 2017/0192921 A1 | 7/2017 | Wang et al. | |
| 2018/0157491 A1 | 6/2018 | Abdallah | |
| 2018/0276046 A1* | 9/2018 | Joao | G06F 11/3024 |
| 2019/0073225 A1* | 3/2019 | Mace | G06F 9/3851 |

OTHER PUBLICATIONS

H. Park et al., "Position-Based Weighted Round-Robin Arbitration for Equality of Service in Many-Core Network-On-Chips", ACM, Proceedings of the Fifth International Workshop on Network on Chip Architectures, Vancouver, B.C., Canada, Dec. 2012, Abstract Only.

M. Lee et al., "Probabilistic Distance-Based Arbitration: Providing Equality of Service for Many-Core CMPS", IEEE/ACM, 43rd Annual IEEE/ACM International Symposium on Microarchitecture, 2010, pp. 1-11.

M.K. Qureshi et al., "Utility-Based Cache Partitioning: A Low-Overhead, High-Performance, Runtime Mechanism to Partition Shared Caches", IEEE, Proceedings of the 39th Annual IEEE/ACM International Symposium on Microarchitecture, 2006, pp. 1-10.

C. Cai et al., "Phurti: Application and Network-Aware Flow Scheduling for Multi-Tenant Mapreduce Clusters", IEEE, 2016 IEEE International Conference on Cloud Engineering (IC2E), pp. 1-10.

* cited by examiner

ACCELERATING MEMORY ACCESS IN A NETWORK USING THREAD PROGRESS BASED ARBITRATION

BACKGROUND

The present invention relates to the field of multi-threaded applications, and specifically to handling cache misses when executing a multi-threaded application in a multi-core mesh. Still more specifically, the present invention assigns priorities in arbitrating cache misses based on past thread progresses for threads in the multi-threaded application.

SUMMARY

In an embodiment of the present invention, a method accelerates memory access in a network using thread progress based arbitration. A memory controller for a network identifies a prioritized thread from multiple threads in an application. The prioritized thread reaches a barrier after other threads from the multiple threads, where the barrier is a stage during which the multiple threads synchronize their operations. The prioritized thread reaches the barrier after the other threads due to the thread encountering more events than the other threads before reaching the first barrier, where the events are from a group consisting of instruction executions, cache misses, and load/store operations in a core. The memory controller detects a cache miss by the prioritized thread during execution of the prioritized thread after the first barrier is reached by the multiple threads. A memory controller then retrieves data from the memory that cures the cache miss for the prioritized thread before retrieving data that cures cache misses for the other threads by applying thread progress based arbitration in the network. The memory controller then transmits data from the memory that cures the cache miss for the prioritized thread to the first core.

In one or more embodiments, the method(s) described herein are performed by an execution of a computer program product and/or a computer system.

DETAILED DESCRIPTION

Figure 1:
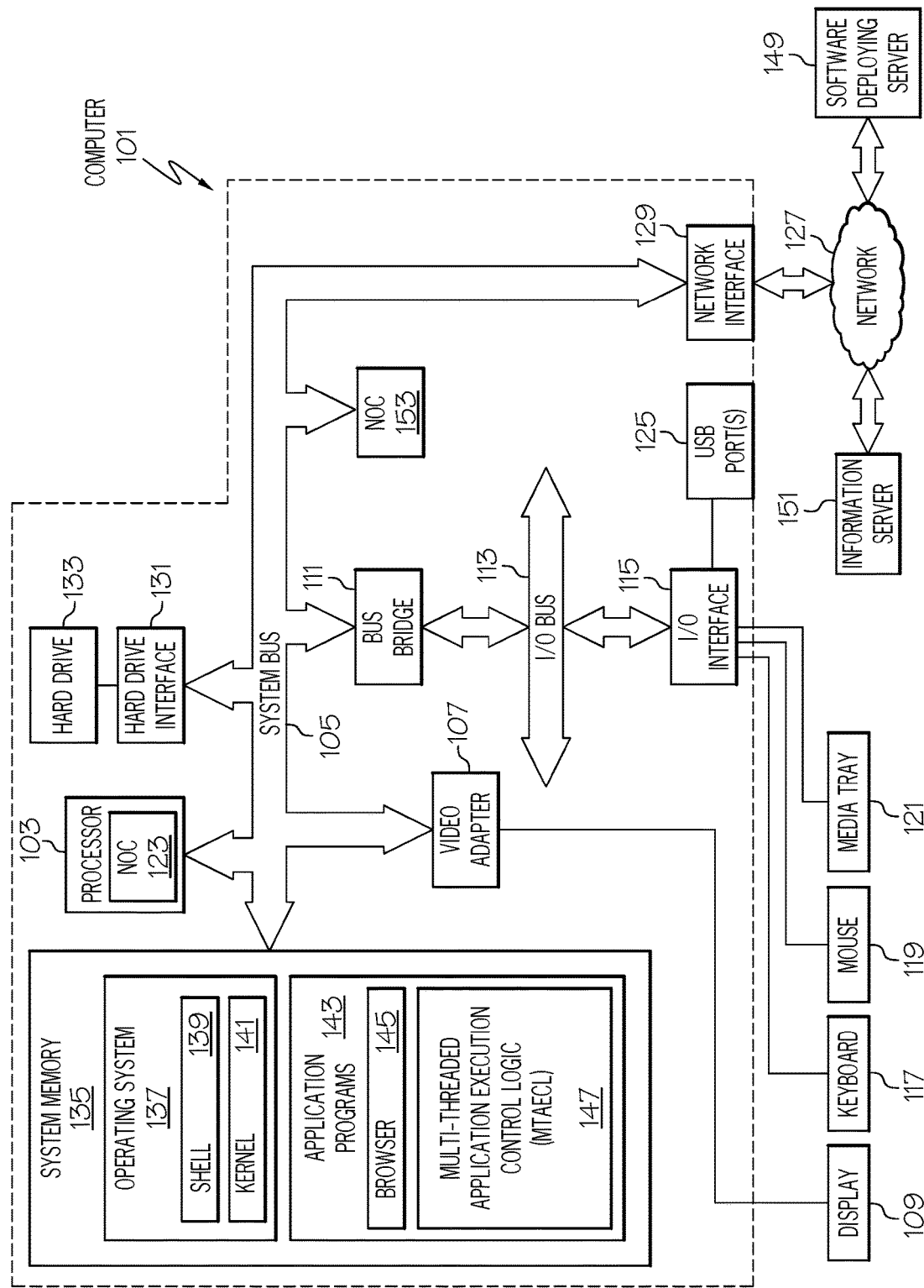
FIG. 1 depicts an exemplary system and network in which the present invention is implemented in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function (s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 101 can be utilized by Network On (a) Chip (NOC) 123, and/or software deploying server 149 and/or information server 151 depicted in FIG. 1 and/or the memory controller 220 and/or processing elements and/or routers depicted in FIG. 2.

Exemplary computer 101 includes a processor 103 that is coupled to a system bus 105. Processor 103 can utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which can include storage devices such as CD-ROM drives, multi-media interfaces, etc.), and external USB port(s) 125. While the format of the ports connected to I/O interface 115 can be any known to those skilled in the art of computer architecture, in one embodiment some or all of these ports are universal serial bus (USB) ports.

As depicted, computer 101 is able to communicate with a software deploying server 149 and/or an information server 151 using a network interface 129 to a network 127. Network interface 129 is a hardware network interface, such as a network interface card (NIC), etc. Network 127 can be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems, such as information server 151. In various embodiments of the present invention, information server 151 serves websites from the WWW, retrieves information from databases, retrieves information from directories, etc.

Application programs 143 in computer 101's system memory (as well as software deploying server 149's system memory) also include a Multi-Threaded Application Execution Control Logic (MTAECL) 147. MTAECL 147 includes code for implementing the processes described below, including those described in FIGS. 2-6. In one embodiment, computer 101 is able to download MTAECL 147 from software deploying server 149, including in an on-demand basis, wherein the code in MTAECL 147 is not downloaded until needed for execution. Note further that, in one embodiment of the present invention, software deploying server 149 performs all of the functions associated with the present invention (including execution of MTAECL 147), thus freeing computer 101 from having to use its own internal computing resources to execute MTAECL 147.

Also part of computer 101 is a Network On (a) Chip (NOC), 123. In an embodiment of the present invention, NOC 123 (as depicted) is part of the architecture of processor 103, while in another embodiment of the present invention NOC 123 is depicted as NOC 153 as a separate chip that is connected to system bus 105. That is, one or more embodiments of the present invention utilize the NOC 123 that is part of processor 103, and/or NOC 153 that is connected to system bus 105. Additional detail of NOC 123 (and/or NOC 153) is presented in FIG. 2.

Note that the hardware elements depicted in computer 101 are not intended to be exhaustive, but rather are representative to highlight essential components required by the present invention. For instance, computer 101 can include alternate memory storage devices such as magnetic cassettes, digital versatile disks (DVDs), Bernoulli cartridges, and the like. These and other variations are intended to be within the spirit and scope of the present invention.

Figure 2:
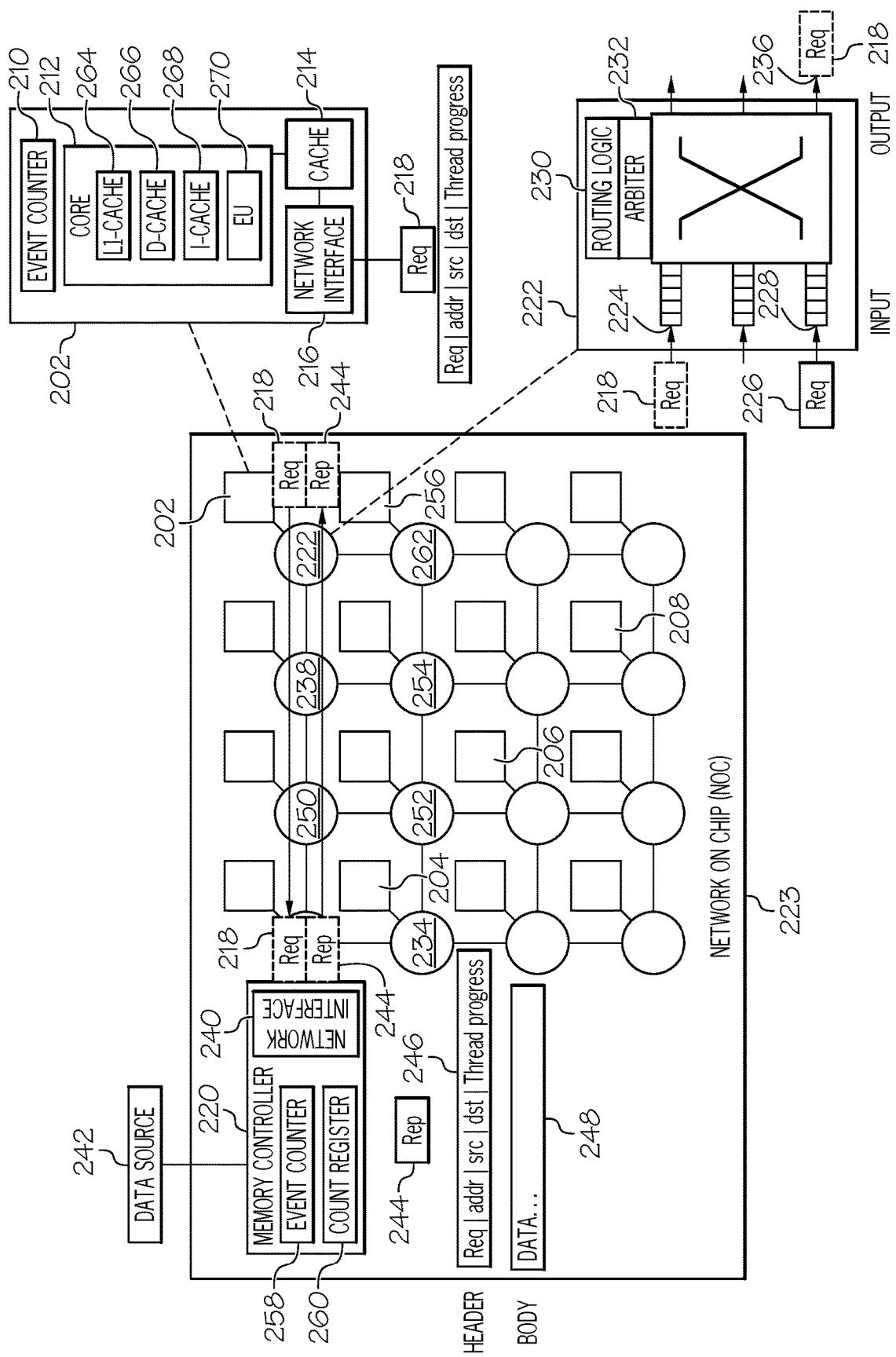
FIG. 2 illustrates an exemplary Network On Chip (NOC) as architected in accordance with one or more embodiments of the present invention.

With reference now to FIG. 2, an exemplary Network On (a) Chip (NOC) 223 (analogous to NOC 123 and/or NOC 153 depicted in FIG. 1) as architected in accordance with one or more embodiments of the present invention is presented.

NOC 223 is an exemplary processing mesh that includes multiple processing nodes, thus enabling the execution of a multi-thread application. That is, and as depicted in FIG. 2, NOC 223 is an exemplary multi-node (or "many-node") logic that has multiple processing elements, each of which have an associated router for exchanging data, inputs, outputs, etc. In FIG. 2, each processing node includes a router (depicted as a circle) and an attached processing element (depicted as a square). Details of an exemplary processing element are shown in FIG. 2 for exemplary processing element 202, and details of an exemplary router are shown in FIG. 2 for router 222.

As the name implies, in one or more embodiments NOC 223 operates as a network, in which packets are exchanged between the various processing nodes using network protocols (e.g., by transmitting Internet protocol (IP) packets among the processing nodes). However, in a preferred embodiment of the present invention, NOC 223 is a mesh of processing nodes that are interconnected by bus/communication lines, which exchange information using bus protocols (e.g., handshakes, magic numbers, etc.).

Before discussing the details of the modifications made to the NOC 223 in accordance with one or more embodiments of the present invention, an overview of a problem being solved by the present invention is now presented.

Multi-core architectures and many-core architectures (such as that shown for NOC 223) use NOC 223 to not only process threads and output results from such thread processing, but also to access a data source 242 (e.g., system memory 135 shown in FIG. 1 and/or hard drive 133 shown in FIG. 1) in the event of a cache miss.

NOC 223 is particularly well architected for processing multi-thread applications, in which multiple threads of code execute simultaneously (in parallel). While each thread can execute using several cores from NOC 223, for purposes of illustration assume that each core (processing element) handles a separate thread from the multi-thread application.

Figure 3:
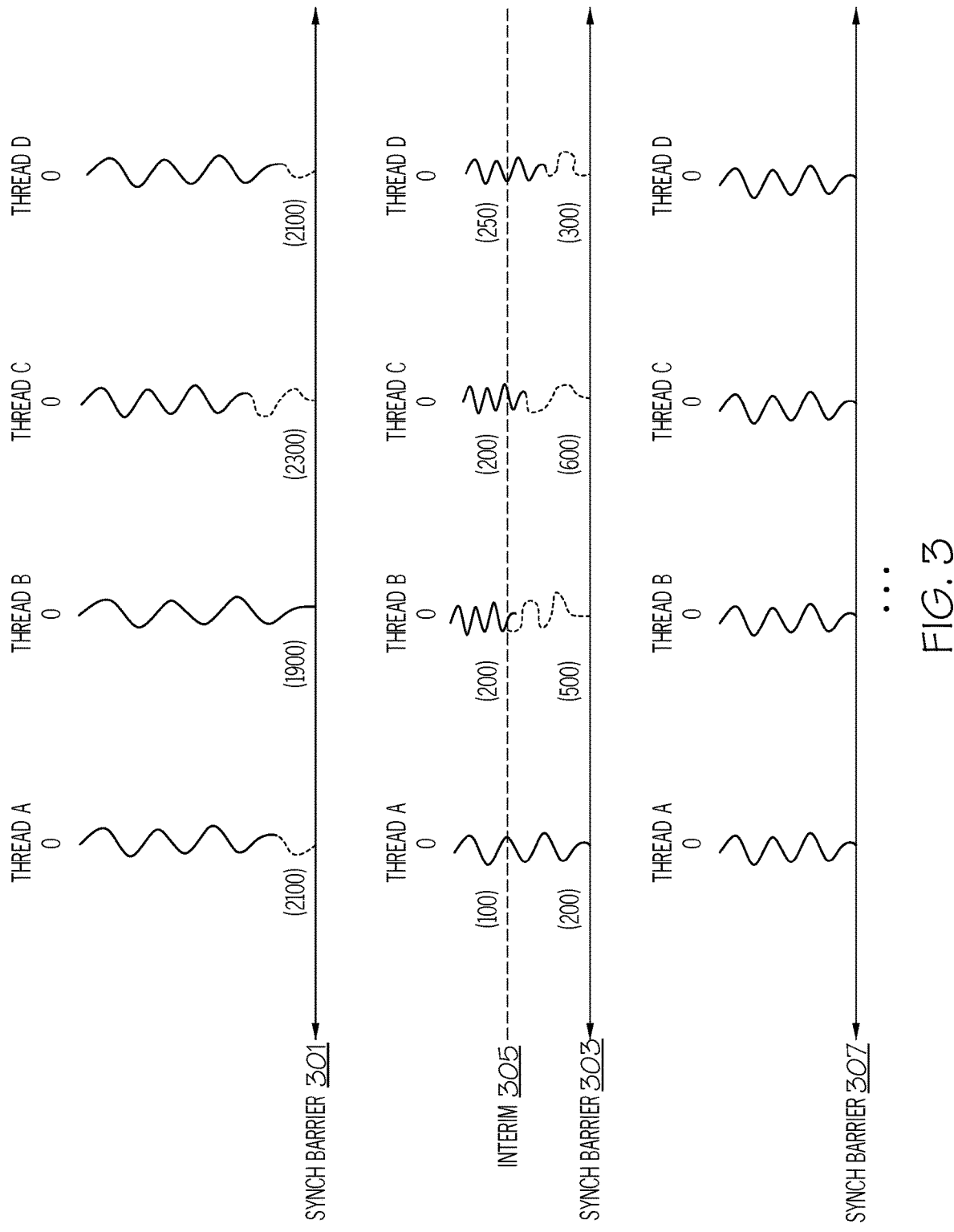
FIG. 3 depicts synch barriers used with a multi-threaded application as used in one or more embodiments of the present invention.

For example, and with reference to FIG. 3, assume that a multi-thread application includes thread A through thread D, where each thread executes in a separate node/processing element shown in FIG. 2. For example, and for purposes of illustration, assume that thread A is executing in processing element 202, thread B is executing in processing element 204, thread C is executing in processing element 206, and thread D is executing in processing element 208 shown in FIG. 2. However, thread A, thread B, thread C, and thread D each have different execution time lengths, even though they were designed to perform essentially the same amount of work, and thus were architected to take approximately the same amount of time to execute before reaching a barrier (also referred to as a "synch barrier" in the present patent application). However, these execution times are altered by events that are encountered when executing a particular thread.

The terms "event" and "progress event" are used interchangeably herein, and are defined as an event that is incurred by a thread that requires time to handle. As such, events include both fully expected events, such as executing an instruction in a thread, to events that are assumed to likely occur, such as load/store executions within a core, to unintended/unexpected events such as cache misses.

For example, and as shown in FIG. 3, assume that thread A, thread B, thread C, and thread D were designed to take the same amount of time to execute. After thread A, thread B, thread C, and thread D all complete their loop iterations, they pause at synch barrier 301, such that their outputs are synchronized. That is, before continuing with an execution of other instructions in their respective threads, thread A, thread B, thread C, and thread D wait on one another until they are all finished executing their first section of instructions, since the output of one thread is often dependent upon the output of another thread, since caches need to be synchronized, etc.

However, thread A, thread B, thread C, and thread D actually reach synch barrier 301 at different times, since they have encountered different quantities of events (e.g., cache misses, they have different numbers of instructions, they have different numbers of load/store instructions, they invoke different numbers of loop operations, etc.) before reaching synch barrier 301.

As shown in FIG. 3, thread A encountered 2100 events before reaching synch barrier 301, thread B encountered 1900 events before reaching synch barrier 301, thread C encountered 2300 events before reaching synch barrier 301, and thread D encountered 2100 events before reaching synch barrier 301. These event counts are from an event counter (e.g., the event counter 210 shown in processing element 202 and/or the event counter 258 shown in memory controller 220 in FIG. 2). As shown in FIG. 3, each event counter (e.g., event counter 210 and/or event counter 258) is set to "0" after all of the threads (e.g., thread A-thread D) reach the synch barrier (e.g., synch barrier 301, synch barrier 303, synch barrier 307, etc.).

One or more embodiments of the present invention take advantage of these event counts in order to determine which thread is to receive priority in handling cache misses. That is, in FIG. 3, thread C is the last to reach synch barrier 301, due at least in part to the fact that it encountered more events (2300) than any of the other threads A, B, D. As such, if thread C encounters a cache miss on its way to synch barrier 303 (or in one embodiment on its way to interim 305, which is a predefined time point after thread A, thread B, thread C, and thread D have resumed execution after synch barrier 301), then thread C is allowed to resolve its cache miss before thread A, thread B, or thread D resolve any cache misses for their operations.

That is, after thread A, thread B, thread C, and thread D synchronize at synch barrier 301, it is determined that thread C will have priority in resolving cache misses over thread A, thread B, and thread D while running between synch barrier 301 and synch barrier 303, since thread C had to deal with so many events before it reached synch barrier 301.

However, in an embodiment of the present invention, each thread counts the events (i.e., "progress events") after reaching a next synch barrier, and compares it to the event count from the last synch barrier.

For example, as shown in FIG. 3, thread A experienced 200 events between the time that it passed synch barrier 301 and the time that it reached synch barrier 303; thread B experienced 500 events between the time that it passed synch barrier 301 and the time that it reached synch barrier 303; thread C experienced 600 events between the time that it passed synch barrier 301 and the time that it reached synch barrier 303; and thread D experienced 300 events between the time that it passed synch barrier 301 and the time that it reached synch barrier 303. These new progress event counts (referred to as a $Count_{cur\_barrier}$) are then used to determine which thread should be given priority when experiencing a cache miss between synch barrier 301 and synch barrier 303 according to the formula:

$$Progress = \frac{Count_{cur\_barrier}}{Count_{last\_barrier}}$$

where $Count_{cur\_barrier}$ is the event count when the thread reaches a current barrier (e.g., synch barrier 303), and where $Count_{last\_barrier}$ is the event count when the thread reached a previous barrier (e.g., synch barrier 301).

For example and using the event count values shown in FIG. 3, the value of "Progress" for thread A is $$\frac{200}{2100} = 0.095;$$

the value of "Progress" for thread B is $$\frac{500}{1900} = 0.263;$$

the value of "Progress" for thread C is $$\frac{600}{2300} = 0.260;$$

and the value of "Progress" for thread D is $$\frac{300}{2100} = 0.143.$$

As such, thread B has the highest value for "Progress", and is give priority over thread A, thread C, and thread D when handling cache misses, even though thread C experienced the most progress events before it reached synch barrier 301 and before it reached synch barrier 303. Nonetheless, the value of "Progress" indicates a highest relative (rational) change in the number progress events between synch barrier 301 and synch barrier 303. That is, the relative increase in events between synch barrier 301 and synch barrier 303 is highest for thread B according to the formula for "Progress". Since thread B has the highest relative change (as defined by the formula for "Progress"), then thread B is given priority for handling cache misses when moving between synch barrier 303 and synch barrier 307.

In another embodiment of the present invention, the events (i.e., "progress events") for each thread are counted after reaching an interim phase/level, and compared to the event count from the last synch barrier. For example, interim 305 is a time after synch barrier 301 occurs but before synch barrier 303 occurs. Thus, using the values shown in FIG. 3, thread A experienced 100 events between the time that it passed synch barrier 301 and the time that it reached interim 305; thread B experienced 200 events between the time that it passed synch barrier 301 and the time that it reached interim 305; thread C experienced 200 events between the time that it passed synch barrier 301 and the time that it reached interim 305 and thread D experienced 250 events between the time that it passed synch barrier 301 and the time that it reached interim 305. These new progress event counts are then used to determine which thread should be given priority when experiencing a cache miss between synch barrier 303 and synch barrier 307 according to the formula:

$$Progress_{interim} = \frac{Count_{interim}}{Count_{last\_barrier}}$$

For example, the value of "$Progress_{interim}$" for thread A is $$\frac{100}{2100} = 0.048;$$

the value of "Progress$_{interim}$" for thread B is $$\frac{200}{1900} = 0.105;$$

the value of "Progress$_{interim}$" for thread C is $$\frac{200}{2300} = 0.087;$$

and the value of "Progress$_{interim}$" for thread D is $$\frac{250}{2100} = 0.119.$$

As such, thread D has the highest value for "Progress$_{interim}$", and is give priority over thread A, thread B, and thread C when handling cache misses, even though thread C experienced the most progress events before it reached synch barrier 301. Nonetheless, the value of "Progress$_{interim}$" indicates a relative (rational) change in the number progress events between synch barrier 301 and interim 305. Since thread D has the highest relative increase in progress events after passing synch barrier 301 but when reaching interim 305 (as defined by the formula for "Progress$_{interim}$"), then in this embodiment thread D is given priority for handling cache misses when moving between synch barrier 301 and interim 305.

As just described, using the raw count of how many progress events occurs leads to one thread (i.e., thread C) receiving priority in handling cache misses; using the formula for "Progress" leads to another thread (i.e., thread B) receiving priority in handling cache misses; and using the formula "Progress$_{interim}$" leads to another thread (i.e., thread D) receiving priority in handling cache misses. Therefore, the system uses deep learning (e.g., a neural network) to "learn" which approach leads to faster run times for the multi-threaded application. That is, the deep learning system compares execution times using these different approaches in order to determine which one is ultimately fastest, thus indicating which approach optimizes the speed at which the multi-threaded application executes.

Once the raw value of events (i.e., the number of events experienced by a particular thread before reaching a particular barrier), the value of Progress, and/or the value of Progress$_{interim}$ is determined, this value (or a combination thereof) populates the request (e.g., request 218 shown in FIG. 2) used to request a datum/instruction to handle a cache miss for a particular thread.

Returning now to FIG. 2, as shown in the expanded view of processing element 202, each of the processing elements in the NOC 223 include the event counter 210 discussed above, a core 212, a network interface 216, and a cache 214.

Core 212 is a set of processing logic devices that include, but are not limited to, a load/store unit for loading instructions and data into one or more execution units (e.g., adders), an instruction fetch logic for fetching instructions, a data fetch logic for fetching data, buffers and registers for storing interim execution results, etc. That is, core 212 is a basic unit of a processing logic. However, core 212 has limited memory (e.g., level-1 cache, not shown), and thus often experiences cache misses when trying to load data and/or instructions from a local data cache and/or instruction cache.

As such, the core 212 will often "hit" a higher-level cache (e.g., level-2 or level-3 cache) in the processing element 202, such as the depicted cache 214.

However, if the data/instruction that is needed is not in cache 214, this is also referred to as a cache miss. As such, the processing element (e.g., processing element 202) sends out a request to a memory controller 220 for the data/instruction (not found in cache 214) from a data source 242, such as system memory 135 shown in FIG. 1 and/or secondary memory such as hard drive 133 shown in FIG. 1, or even a remote location such as a webpage, a database server, etc. (all depicted as an information server 151 in FIG. 1).

In order to resolve a cache miss, processing element 202 uses a network interface 216 to send a request 218 to the memory controller 220 requesting the needed data/instruction. As shown in FIG. 2, an exemplary request 218 includes a leading field identifying it as a request for data and or an instruction ("Req"); a field identifying the virtual and/or physical address of the data/instruction being requested ("addr"); an identifier for the processing element that is requesting the data/instruction ("src"); an identifier for the processing element to which the data/instruction is to be sent ("dst"), which is often the same as the processing element that is requesting the data, although in some embodiments is another processing element within NOC 223 or even another location entirely; and a novel (not found in the prior art) field that describes a history of the thread progress ("Thread progress"). That is, the "Thread progress" describes a past history of a thread that needs the requested data/instruction (e.g., see FIG. 3).

Continuing with FIG. 2, processing element 202, like all of the processing elements in NOC 223, has a dedicated (i.e., associated) router (e.g., router 222 which is represented as both a circle as well as in an expanded view in FIG. 2) that services only processing element 202 (as depicted in FIG. 2). In another embodiment (not depicted), router 222 is used by multiple processing elements (e.g., processing element 202 as well as processing element 256) shown in NOC 223.

Assume now, for purposes of illustration, that the core 212 in processing unit 202 has experienced cache misses when requesting a datum/instruction for use by an execution unit (e.g., a processing logic such as an adder, a comparer, etc., depicted as execution unit (EU) 270) from its internal data cache (D-cache 266), it internal instruction cache (I-cache 268), its local L-1 cache 264, as well as a higher level (e.g., L-2) cache 214 that is external to the core 212 but still within the processing element 202. Upon this cache miss at cache 214, the processing element 202 sends, via its network interface 216, request 218 to router 222 to retrieve the needed data/instruction that was not locally found due to this cache miss.

However, router 222 is able to receive multiple simultaneous requests for data, including the request 218 that is received by input 224 as well as another request 226 that is received by input 228 from another processing element (e.g., processing element 256) via another router (e.g., router 262). As such, a routing logic 230 must decide which request (request 218 or request 226) gets to "go first" when being sent on from router 222 to (ultimately) memory controller 220).

In a prior scenario, the decision as to which request gets priority was performed using a "round robin" protocol; an "oldest goes first" protocol; or a "most important goes first" protocol.

That is, in a "round robin" manner, the priority of data requests for use by different thread goes back and forth, such that thread A gets priority first, then thread B get priority in the next pass-through, then thread A get priority if it needs another datum, etc. However, this is inefficient, since there are many scenarios in which thread B needs to have priority over thread A (e.g., where thread B is producing an output that is needed by many more threads than the output provided by thread A) even if it is not its turn, which is not accounted for by the "round robin" protocol.

In an "oldest goes first" manner, whichever request is the oldest gets priority. For example, assume that router 234 has simultaneously received a data request from both processing element 206 as well as from processing element 208. Since processing element 208 is physically farther away from router 234 than processing element 206, then a request from processing element 208 will take longer to reach router 234 than a request from processing element 206. As such, the request from processing element 208 will be older than the request from processing element 206 by the time both requests reach router 234, and thus the request from processing element 208 will be given priority. However, this is inefficient, since every request from processing element 208 will always be given priority over any request from processing element 206, thus unfairly penalizing processing element 206 when sending a request to router 234.

In a "most important goes first" protocol, a particular thread is predetermined (e.g., by a programmer) as being more important than any other thread, and thus requests for data from the "most important" thread get priority over other "less important" threads. However, this protocol is inefficient, since determining which thread is "most important" is often arbitrarily determined. Furthermore, even if a particular first thread is indeed more important at some initial time, another second thread is likely to be the most important at a subsequent time, even though the first thread still has the title/property of being "most important".

As such, the routing logic 230 in arbiter 232 uses the novel thread progress described herein to determine which incoming data request is to receive priority, thus optimizing the efficiency of the multi-threaded application since cache misses are handled in a manner that allows the overall completion of the execution of the multi-threaded application to take less time since the different threads reach barriers at a (closer) same time.

As shown in FIG. 2, the request 218 (using one or more of the protocols described in FIG. 3) is given priority, and thus is the first to exit the router 222 from output port 236, such that request 218 moves on to a next router (e.g., router 238) on the way to the network interface 240 in memory controller 220. That is, router 222, like router 238 and other routers between processing element 202 and memory controller 220 all prioritize requests based on the value of the "Thread progress" field in the request. The value in the "Thread progress" is one of the values generated using the exemplary processes described for FIG. 3.

Continuing with FIG. 2, assume that request 218 has reached memory controller 220, which then retrieves the requested data from a data source 242, such as system memory 135 shown in FIG. 1, hard drive 133 shown in FIG. 1, directories (not shown), lower level caches (e.g., L-2 or L-cache, not shown), etc.

As such, the memory controller 220 constructs a reply 244, which includes a header 246 that includes the address of the data, the source that requested the data, the destination of the reply, etc. The reply 244 also includes the requested data itself in the reply body 248.

As shown in FIG. 2, assuming that processing element 202 is the named destination for the retrieved data, reply 244 then travels through a series of routers back to processing element 202. In an embodiment of the present invention, the reply 244 takes the same router pathway back to the processing element 202 as used by the request 218, as shown in FIG. 2 going through routers 250, 238, and 222. In another embodiment of the present invention, the reply 244 takes a different router pathway (e.g., going through routers 234, 252, 254, and 262) back to the processing element 202.

In an embodiment of the present invention, routers used by reply 244 (e.g., routers 250, 238, 222 or routers 234, 252, 254, 262) use the "Thread progress" information found in the request 218 to determine the priority of the movement of reply 244 though the routers without arbitration. That is, the reply 244 to request 218 is sent back to processing element 202 with full priority when reaching routers 250, 238, 222, who have a record of request 218 passing through them, and thus will give the reply 244 automatic priority when being returned to processing element 202.

In another embodiment of the present invention, routers used by reply 244 (e.g., routers 250, 238, 222 or routers 234, 252, 254, 262) use the "Thread progress" information found in the request 218 to determine the priority of the movement of reply 244 though the routers. That is, just as the "Thread progress" field in the request 218 was used by the routers to determine which request is to be given priority when passing through the routers, this same "Thread progress" field in the reply 244 is used by the routers to determine which reply is to be give priority when passing through the routers.

Figure 4:
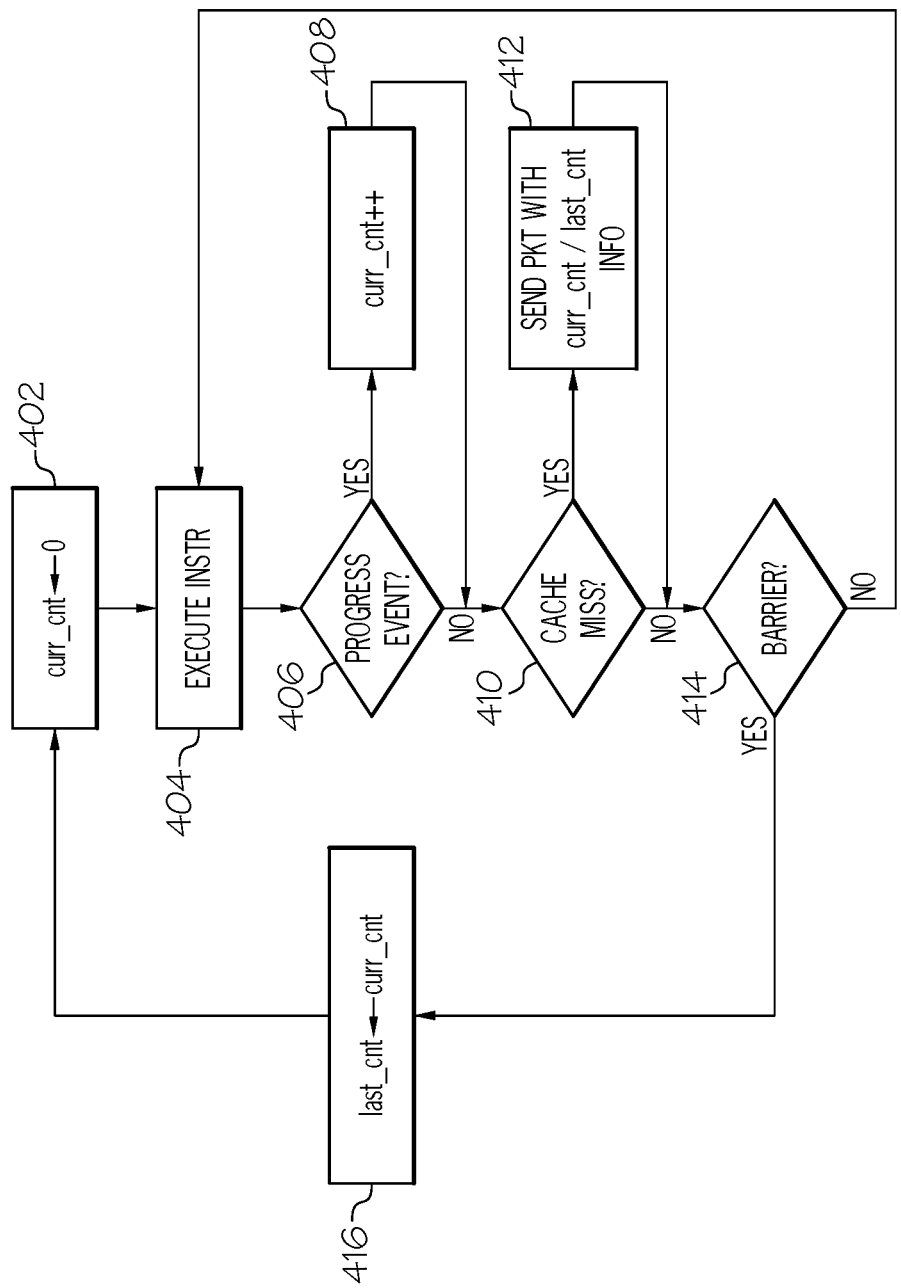
FIG. 4 is a high-level flow-chart of one or more steps executed by one or more processors to maintain an event count for threads in a multi-threaded application in accordance with one or more embodiments of the present invention.

With reference now to FIG. 4, a high-level flow-chart of one or more steps executed by one or more processors to maintain an event count for threads in a multi-threaded application in accordance with one or more embodiments of the present invention is presented.

As shown in block 402, a current count of events is reset to zero after passing each barrier, as shown in FIG. 3.

As described in block 404 in FIG. 4, a next instruction in a particular thread (e.g., thread A shown in FIG. 3) is then executed. A query is made (query block 406) as to whether a progress event (e.g., a cache miss, a load/store instruction, an execution of the instruction itself, etc.) has occurred. That is, the fact that an instruction executed (as indicated by block 404) will always results in the progress count increasing by one (block 408). Other progress events, such as a loop, a load/store special instruction, etc., will also cause the progress count depicted in block 408 to increase.

If the progress event is in fact a cache miss (query block 410), then the processing element (e.g., processing element 202 shown in FIG. 2) sends a packet with the current count and last count information (block 412) about the thread that has incurred the cache miss. That is, the packet described in block 412 sends an update of the event count to the event counter 210 and/or the event counter 258 shown in FIG. 2, and includes a current count/last count ("curr_cnt/last_cnt") information as described in detail in FIG. 3.

The query in query block 414 determines whether a barrier (e.g., synch barrier 303 shown in FIG. 3) has been reached. As a thread will often incur scores, hundreds, or even thousands of instruction execution events and other progress events before it reaches a barrier, the answer to query block 414 is initially "No" while these many events occur. However, eventually the thread will complete its work and will reach the synchronization barrier ("Yes"), causing the current count of progress events for that thread to be stored as the "last count" of events (block 416), which are used when determining priority for that thread after passing the latest barrier.

Figure 5:
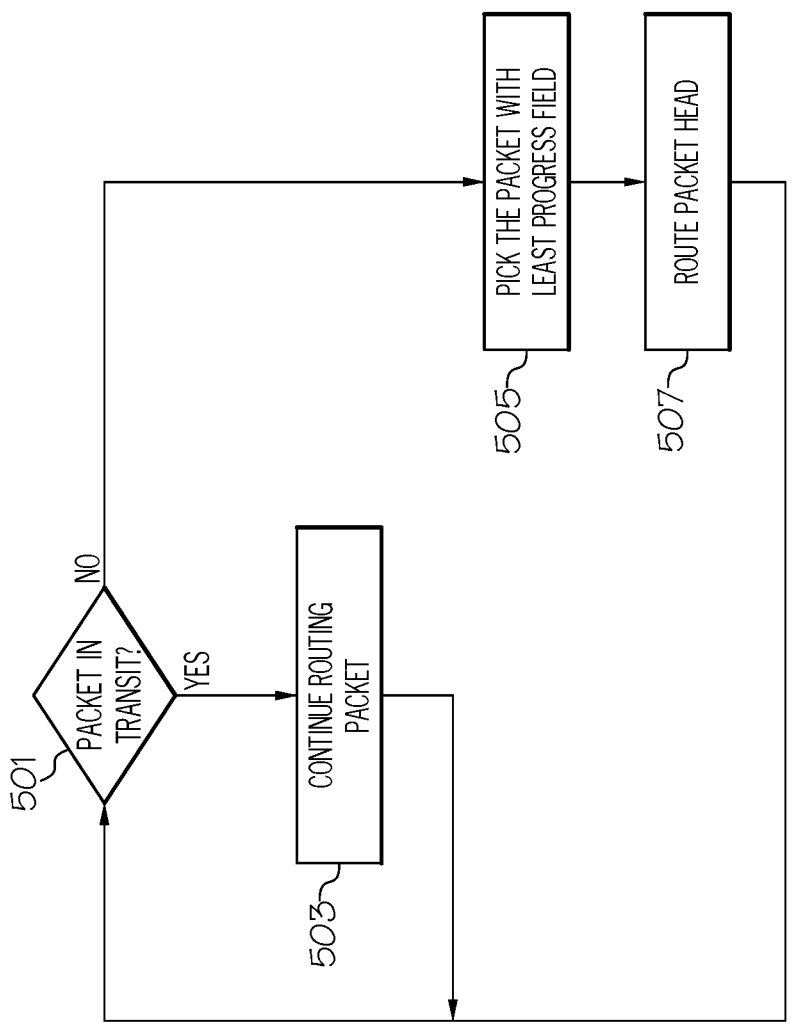
FIG. 5 is a high-level flow-chart of one or more steps executed by one or more processors for selecting a prioritized thread, from a multi-threaded application, which has priority in obtaining data to cure a cache miss in accordance with one or more embodiments of the present invention.

With reference now to FIG. 5, a high-level flow-chart of one or more steps executed by one or more processors for selecting a prioritized thread, from a multi-threaded application, which has priority in obtaining data to cure a cache miss in accordance with one or more embodiments of the present invention is presented.

As shown in query block 501, a first step is to determine whether a packet (e.g., request 216 and/or reply 244 shown in FIG. 2) is in transit to a router (e.g., router 222 shown in FIG. 2). That is, request 218 has been described above with an assumption that it is already at the input 224 of router 222. However, if request 218 still is not at the input 224 of router 222 (e.g., is still in transit from processing element 202, is in a "waiting buffer" (not shown) for router 222, etc.), then as shown in block 503 of FIG. 5 the routing of the packet that is already at the input of the router 222 continues.

However, if the packet is not in transit (e.g., is at the input of the router), then the packet with the least progress field is picked as having priority over other packets at the input of the router (block 505). The "least progress field" (e.g., the "Thread progress" field shown in request 218 in FIG. 2) describes a processing history of that particular thread in which it was the slowest to reach a previous barrier, has a certain current progress/last progress ratio, etc. (see the discussion for FIG. 3).

As described in block 507, the packet with the least progress field is given priority over other packets at the input of the router, and is then routed on by the router.

Figure 6:
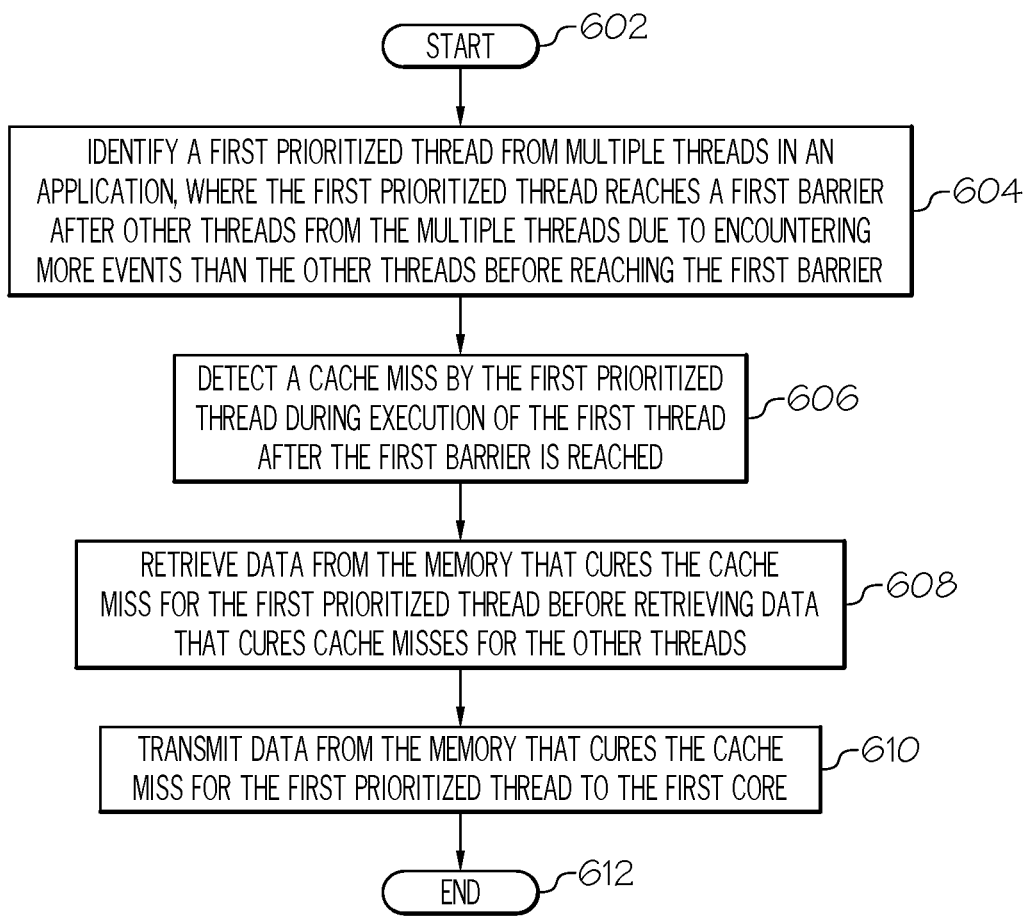
FIG. 6 is a high-level flow-chart of one or more steps performed in accordance with one or more embodiments of the present invention.

With reference now to FIG. 6, a high-level flow-chart of one or more steps performed in accordance with one or more embodiments of the present invention is presented.

After initiator block 602, a memory controller (e.g., memory controller 220 shown in FIG. 2) in a network (e.g., NOC 223) identifies a first prioritized thread (e.g., thread C shown in FIG. 3) from multiple threads (e.g., threads A-D) in an application, as described in block 604. In an embodiment of the present invention, the first prioritized thread reaches a first barrier (synch barrier 301 shown in FIG. 3) after other threads from the multiple threads, wherein a barrier (e.g., synch barrier 301) is a stage at which the multiple threads synchronize. That is, when all threads in the multi-threaded application reach a barrier upon completion of predefined portions of their instructions, the threads synchronize by sending their output results to other processes that need these output results as inputs, by harmonizing caches that hold output results of the multiple threads and other information related to the execution of the multiple threads (e.g., cache "dirty" bits, interim values to be used later, etc.), etc.

In an embodiment of the present invention, the first prioritized thread reaches the first barrier after the other threads due to the first prioritized thread encountering more events than the other threads before reaching the first barrier. As described herein, exemplary events ("progress events") include the execution of instructions, cache misses, load/store operations in a core, and/or loops, etc.

As described in block 606 in FIG. 6, the memory controller detects a cache miss by the first prioritized thread during execution of the first prioritized thread after the first barrier is reached. That is, assume that thread C has passed synch barrier 301 shown in FIG. 3, and is now continuing to execute instructions from thread C between the time indicated between synch barrier 301 and synch barrier 303 (or interim 305). Assume further that during this time period (e.g., between synch barrier 301 and synch barrier 303) that the core 212 in processing unit 202 that is executing thread C has encountered a cache miss in the cache 214 shown in FIG. 2.

For example, assume that a data cache (e.g., D-cache 266 shown in FIG. 2) and/or an instruction cache (e.g., I-cache 268) shown in FIG. 2) within the core 212 supply data/instructions to an execution unit (e.g., execution unit 270 shown in FIG. 2, such as a "Floating Point Unit—FPU" execution unit that adds two numbers that have decimal points) within the core 212. If the logic within the core 212 tries to obtain this datum/instruction from the data/instruction cache within the core 212, but the requisite data/instruction is not in the data/instruction cache, then this is an initial cache "miss", and the data/instruction need to be retrieved from a local cache (e.g., the L-1 cache 264 shown in FIG. 2).

If the data/instruction is not in the L-1 cache 264, then the core 212 will request the data from a local L-2 cache (or L-3 cache, if an L-2 cache is within the core 212), which is depicted as cache 214 shown in FIG. 2. However, if the data/instruction are not found in the cache 214, then another cache miss occurs (as depicted in FIG. 2), and the data/instruction needs to be retrieved from data source 242 (which contains data and/or instructions) for use by core 212.

As described in block 608 in FIG. 6, the memory controller (e.g., memory controller 220 shown in FIG. 2) retrieves data from the memory (e.g., data source 242, which in various embodiments is system memory, persistent memory, and/or memories that contain directories, websites, etc. which provide the needed data and/or instructions) that cures the cache miss for the first prioritized thread before retrieving data that cures cache misses for the other threads by applying thread progress based arbitration in the network.

That is, in an embodiment of the present invention, memory controller 220 is, as the name indicates, a memory controller for accessing system memory. However, in other embodiments of the present invention, memory controller is a device for accessing a persistent memory (e.g., the hard drive interface 131 for accessing the hard drive 133 shown in FIG. 1); a device for accessing data from a network (e.g., network interface 129 accessing data from an information server 151 via the network 127 shown in FIG. 1); etc.

As described in block 610, the memory controller then transmits data from the memory (e.g., data source 242 shown in FIG. 2) that cures the cache miss for the first prioritized thread to the first core. As such, retrieving and transmitting the data from the memory that cures the cache miss for the first prioritized thread before retrieving data that cures cache misses for the other threads accelerates memory access for the first prioritized thread by applying the thread progress based arbitration. That is, the cache-miss data is retrieved in a manner that accelerates memory accesses since threads that are historically shown to encounter more progress events are given priority over other threads, such that the overall speed of the multi-threaded operation increases, since the other threads (that are encountering fewer progress events) are not having to wait for that thread (with the greater number of progress events) to reach the synch barrier.

The flow-chart shown in FIG. 6 ends at terminator block 612.

In an embodiment and as shown in FIG. 2, the network is a Network On Chip (NOC), also known as a Network On a Chip, but still called a NOC.

In an embodiment of the present invention, each node in the NOC includes a processing element (e.g., processing element 202 shown in FIG. 2), and a router (e.g., router 222 shown in FIG. 2). With each router is an arbiter (e.g., arbiter 232 shown in FIG. 2), which uses routing logic (i.e., processing logic such as routing logic 230 that determines which packet at its input is given priority to move on to the output 230). Thus, the arbiter prioritizes requests for memory accesses to a memory controller that is associated with the NOC.

In an embodiment of the present invention, the memory that cures the cache miss for the first prioritized thread is a system memory that supports the NOC, while in other embodiments the memory is a hard drive, or even a database, a webpage, etc.

In an embodiment and as described with reference to FIG. 3, the memory controller counts the events that are encountered by each of the multiple threads when reaching the first barrier; stores a first event count of the events that are encountered by each of the multiple threads when reaching the first barrier in an event counter; in response to the multiple threads reaching the first barrier, stores the first event count, resets the event counter, and continues to execute the multiple threads after the first barrier. The memory controller then counts the events that are encountered by each of the multiple threads before reaching a second barrier that is after the first barrier; stores a second event count of the events that are encountered by each of the multiple threads before reaching the second barrier in the event counter; calculates an event ratio between the first event count and the second event count for each of the multiple threads; and identifies a second prioritized thread whose event ratio is greater than event ratios of the other threads. The memory controller later detects a cache miss by the second prioritized thread during execution of the second prioritized thread after the first barrier is reached; retrieves data from the memory that cures the cache miss for the second prioritized thread after the first barrier is reached before retrieving data that cures cache misses for the other threads after the first barrier is reached; and transmits data from the memory that cures the cache miss for the first prioritized thread to the first core.

That is, the memory controller (e.g., memory controller 220 shown in FIG. 2) counts the events (i.e., progress events) that are encountered by each of the multiple threads (e.g., threads A-D) as they are traveling towards the first barrier (e.g., synch barrier 301 shown in FIG. 3) using an event counter 258 shown in FIG. 2. The event counts are achieved by the memory control 220 monitoring threads running in the various processing elements in the NOC 223, such as receiving a message/signal from each of the processing elements whenever they encounter a progress event. A running tab of these progress events for each thread is stored in event counter 258. For example, and as shown in FIG. 3, thread A has encountered 2100 progress events, thread B has encountered 1900 progress events, thread C has encountered 2300 progress events, and thread D has encountered 2100 progress events before reaching synch barrier 301. The memory controller stores a count of these progress events in the event counter 258 shown in FIG. 2.

In response to the multiple threads (A-D) all reaching the first barrier, the memory controller stores the first event count (e.g., in a count register such as count register 260 shown in FIG. 2), resets the event counter 258, and continues to execute the multiple threads after the first barrier, as shown in FIG. 3.

The memory controller then counts (using the now reset event counter 258) the progress events that are encountered by each of the multiple threads before reaching a second barrier that is after the first barrier (e.g., between synch barrier 301 and synch barrier 303), such that the event counter 258 now stores a second event count of the events that are encountered by each of the multiple threads before reaching the second barrier. The memory controller 220 then calculates an event ratio between the first event count and the second event count for each of the multiple threads using the contents of the event counter 258 (which holds the current progress event count after the synch barrier 301) and the count register 260 (which hold the past progress event count at the synch barrier 301). This ratio (between the current event count after the first barrier and the previous event count at the time of the first barrier) identifies a second prioritized thread whose event ratio is greater than event ratios of the other threads. The memory controller later detects a cache miss by the second prioritized thread during execution of the second prioritized thread after the first barrier is reached; retrieves data from the memory that cures the cache miss for the second prioritized thread after the first barrier is reached before retrieving data that cures cache misses for the other threads after the first barrier is reached; and transmits data from the memory that cures the cache miss for the first prioritized thread to the first core.

In an embodiment of the present invention, a header in a packet requesting the memory that cures the cache miss for the first prioritized thread includes a thread progress field that describes a quantity of the events that are encountered by the first prioritized thread before reaching the first barrier (see the "Thread progress" field in the request 218 depicted in FIG. 2).

While the present invention has been described thus far primarily as using a memory controller 220 to access a data source 242 that is external to the NOC 223, in an embodiment of the present invention the core 212 in exemplary processing element 202 utilizes the process described above to access a cache in another processing element within the NOC 223.

For example, assume that processing unit 208 shown in FIG. 2 has a cache (not depicted) similar to cache 214 shown in processing unit 202. Assume further that the cache in the processing unit 208 contains data that processing unit 202 needs (but does not have, thus resulting in the cache miss for processing unit 202). As such, memory controller 220 further functions as a cache controller, in which it maintains a record of caches states (e.g., clean, dirty, etc.) and/or the content of caches in some or all of the processing units within NOC 223. Thus, when processing unit 202 requests data to cure the cache miss in cache 214, the memory controller 220 will first check caches of other processing units within NOC 223. If a cache "hit" occurs (i.e., the data/instruction needed by processing unit 202 is found in a cache in another of the processing units in NOC 223), then that cache data is returned to the first processing unit/core. However, if a cache "miss" occurs (i.e., the data/instruction needed by processing unit 202 is not found in a cache in another of the processing units in NOC 223), then memory controller will access the external data source 242 for the requisite data/instruction, which is then returned to processing unit 202 utilizing the prioritization protocol described herein.

Figure 7:
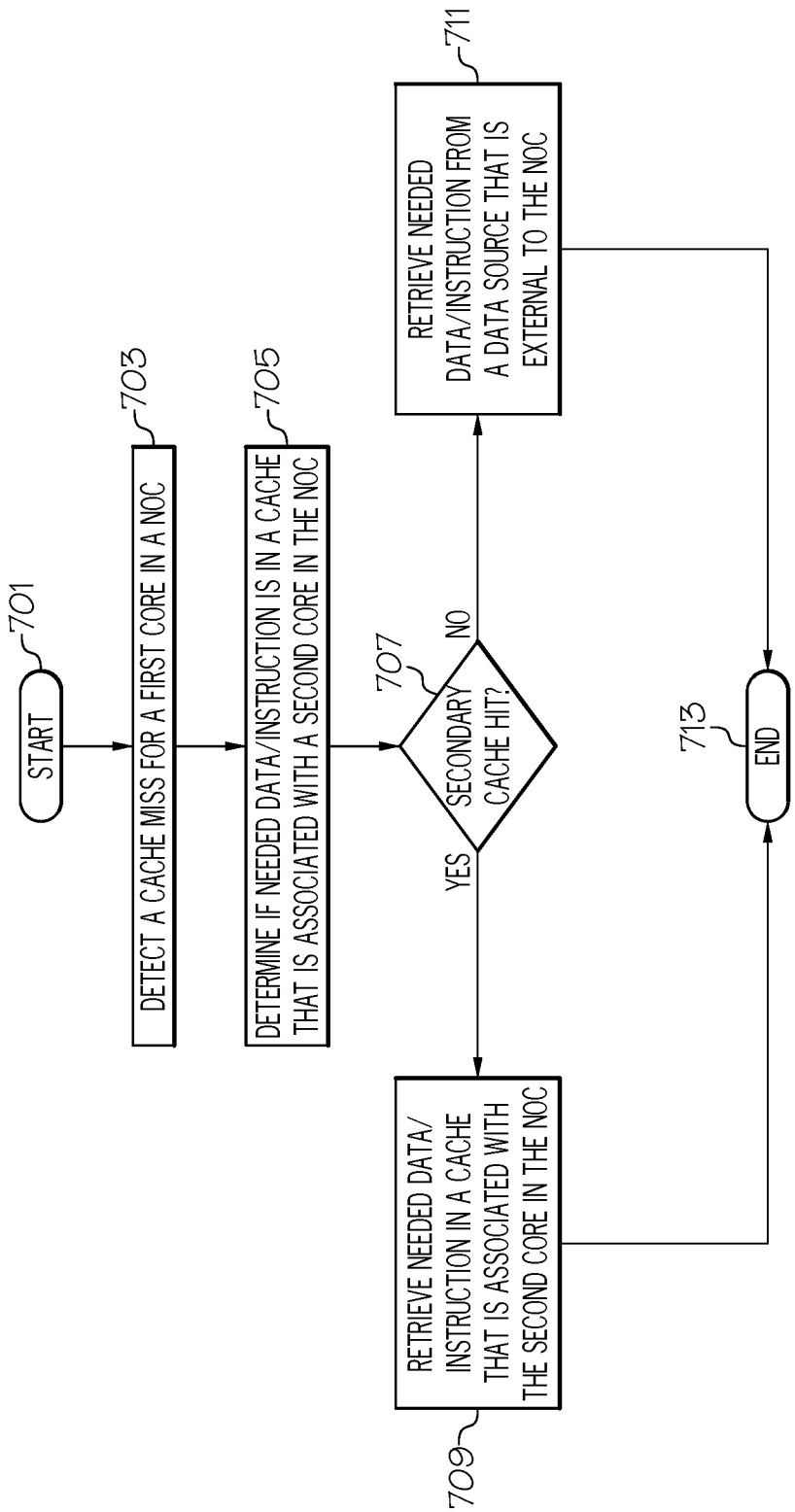
FIG. 7 is a high-level flow-chart of an embodiment of the present invention in which data responsive to a cache miss in a first processing element in a network is cured by a cache in a second processing element in the network.

With reference now to FIG. 7, after initiator block 701 a memory/cache controller (depicted as memory controller 220 in FIG. 2) detects a cache miss in a first core (e.g., core 212 in processing unit 202 shown in FIG. 2 has experienced a cache miss to cache 214), as shown in block 703.

As shown in block 705, the memory/cache controller first determines if the requisite data/instruction that is needed by the first core (but not available, thus the cache miss) is located in any of the local caches in other processing units (e.g., processing unit 208) in the NOC.

If the answer to question in query block 707 as to whether a secondary cache hit occurred when accessing the cache associated with another processing unit in the NOC is "Yes", (i.e., the data/instruction needed by processing unit 202 is found in a cache in another of the processing units in NOC 223), then that cache data is returned to the first processing unit/core, as described in block 709, and the process ends at terminator block 713.

However, if the answer to query block 707 is "No", (i.e., the data/instruction needed by processing unit 202 is not found in a cache in another of the processing units in NOC 223), then memory controller will access an external data source (e.g., external data source 242 shown in FIG. 2) for the requisite data/instruction (block 711), which is then returned to processing unit 202 utilizing the prioritization protocol described herein, and the process ends (terminator block 713). As described herein, the external data source 202 is "external" to the NOC 223, an includes, but is not limited to, a system memory in a computer system that supports/uses the NOC 223, a hard drive in a computer system that supports/uses the NOC 223, a database that is external to the NOC 223 and/or a computer system that supports/uses the NOC 223, etc.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
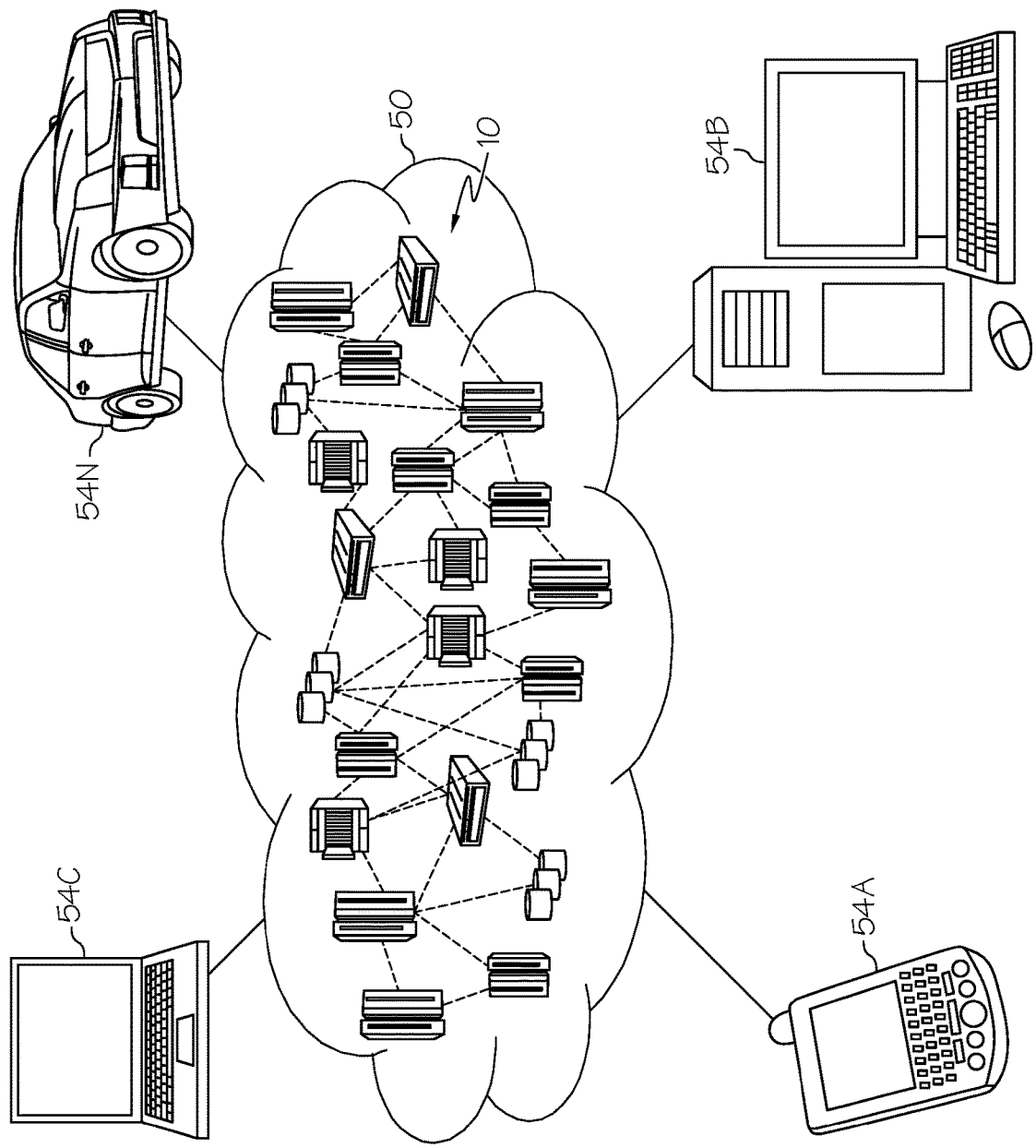
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
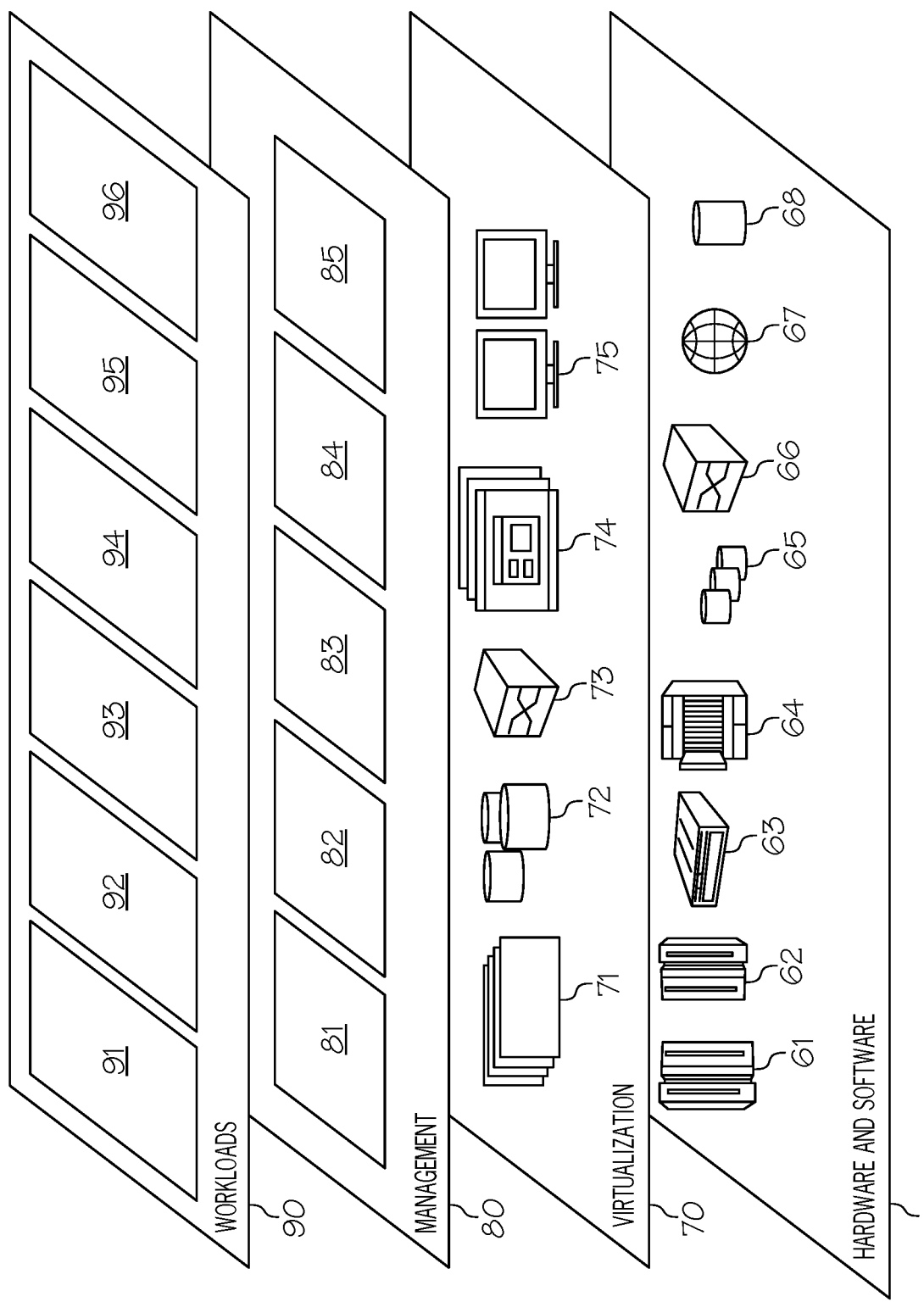
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and cache access optimization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   identifying, by a memory controller, a first prioritized thread from multiple threads in an application, wherein the first prioritized thread is executing in a first core in a network, wherein the first prioritized thread reaches a first barrier after other threads from the multiple threads, wherein a barrier is a stage at which the multiple threads synchronize, wherein the first prioritized thread reaches the first barrier after the other threads due to the first prioritized thread encountering more events than the other threads before reaching the first barrier, and wherein the events are from a group consisting of instruction executions, cache misses, and load/store operations in a core;
   detecting, by the memory controller, a cache miss by the first prioritized thread during execution of the first prioritized thread after the first barrier is reached by the multiple threads;
   retrieving, by the memory controller, data from a memory that cures the cache miss for the first prioritized thread before retrieving data that cures cache misses for the other threads by applying thread progress based arbitration in the network; and
   transmitting, by the memory controller, data from the memory that cures the cache miss for the first prioritized thread to the first core, wherein retrieving and transmitting the data from the memory that cures the cache miss for the first prioritized thread before retrieving data that cures cache misses for the other threads accelerates memory access for the first prioritized thread by applying the thread progress based arbitration.

2. The method of claim 1, wherein each of the multiple threads uses a separate core in the network.

3. The method of claim 1, wherein the network is a Network On Chip (NOC).

4. The method of claim 3, wherein each node in the NOC comprises an arbiter, and wherein the arbiter prioritizes requests for memory accesses to a memory controller that is associated with the NOC.

5. The method of claim 3, wherein the memory that cures the cache miss for the first prioritized thread is a system memory that supports the NOC.

6. The method of claim 3, wherein the memory that cures the cache miss for the first prioritized thread is a cache memory associated with a second core in the NOC.

7. The method of claim 1, further comprising:
counting, by the memory controller, the events that are encountered by each of the multiple threads when reaching the first barrier;
storing, by the memory controller, a first event count of the events that are encountered by each of the multiple threads when reaching the first barrier in an event counter;
in response to the multiple threads reaching the first barrier, storing, by the memory controller, the first event count, resetting the event counter, and continuing to execute the multiple threads after the first barrier;
counting, by the memory controller, the events that are encountered by each of the multiple threads before reaching a second barrier that is after the first barrier;
storing a second event count of the events that are encountered by each of the multiple threads before reaching the second barrier in the event counter;
calculating, by the memory controller, an event ratio between the first event count and the second event count for each of the multiple threads;
identifying, by the memory controller, a second prioritized thread whose event ratio is greater than event ratios of the other threads;
detecting, by the memory controller, a cache miss by the second prioritized thread during execution of the second prioritized thread after the first barrier is reached;
retrieving, by the memory controller, data from the memory that cures the cache miss for the second prioritized thread after the first barrier is reached before retrieving data that cures cache misses for the other threads after the first barrier is reached; and
transmitting, by the memory controller, data from the memory that cures the cache miss for the first prioritized thread to the first core.

8. The method of claim 1, wherein a header in a packet requesting the memory that cures the cache miss for the first prioritized thread includes a thread progress field that describes a quantity of the events that are encountered by the first prioritized thread before reaching the first barrier.

9. A computer program product comprising a computer readable storage medium having program code embodied therewith, wherein the computer readable storage medium is not a transitory signal per se, and wherein the program code is readable and executable by a processor to perform a method comprising:

identifying a first prioritized thread from multiple threads in an application, wherein the first prioritized thread is executing in a first core in a network, wherein the first prioritized thread reaches a first barrier after other threads from the multiple threads, wherein a barrier is a stage at which the multiple threads synchronize, wherein the first prioritized thread reaches the first barrier after the other threads due to the first prioritized thread encountering more events than the other threads before reaching the first barrier, and wherein the events are from a group consisting of instruction executions, cache misses, and load/store operations in a core;
detecting a cache miss by the first prioritized thread during execution of the first prioritized thread after the first barrier is reached by the multiple threads;
retrieving data from a memory that cures the cache miss for the first prioritized thread before retrieving data that cures cache misses for the other threads by applying thread progress based arbitration in the network; and
transmitting data from the memory that cures the cache miss for the first prioritized thread to the first core, wherein retrieving and transmitting the data from the memory that cures the cache miss for the first prioritized thread before retrieving data that cures cache misses for the other threads accelerates memory access for the first prioritized thread by applying the thread progress based arbitration.

10. The computer program product of claim 9, wherein the network is a Network On Chip (NOC), and wherein the memory that cures the cache miss for the first prioritized thread is a system memory that supports the NOC.

11. The computer program product of claim 9, wherein the method further comprises:
counting the events that are encountered by each of the multiple threads when reaching the first barrier;
storing a first event count of the events that are encountered by each of the multiple threads when reaching the first barrier in an event counter;
in response to the multiple threads reaching the first barrier, storing the first event count, resetting the event counter, and continuing to execute the multiple threads after the first barrier;
counting the events that are encountered by each of the multiple threads before reaching a second barrier that is after the first barrier;
storing a second event count of the events that are encountered by each of the multiple threads before reaching the second barrier in the event counter;
calculating an event ratio between the first event count and the second event count for each of the multiple threads;
identifying a second prioritized thread whose event ratio is greater than event ratios of the other threads;
detecting a cache miss by the second prioritized thread during execution of the second prioritized thread after the first barrier is reached; and
retrieving data from the memory that cures the cache miss for the second prioritized thread after the first barrier is reached before retrieving data that cures cache misses for the other threads after the first barrier is reached.

12. The computer program product of claim 9, wherein a header in a packet requesting the memory that cures the cache miss for the first prioritized thread includes a thread progress field that describes a quantity of the events that are encountered by the first prioritized thread before reaching the first barrier.

13. The computer program product of claim 9, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

identifying a first prioritized thread from multiple threads in an application, wherein the first prioritized thread is executing in a first core in a network, wherein the first prioritized thread reaches a first barrier after other threads from the multiple threads, wherein a barrier is a stage at which the multiple threads synchronize, wherein the first prioritized thread reaches the first barrier after the other threads due to the first prioritized thread encountering more events than the other threads before reaching the first barrier, and wherein the events are from a group consisting of instruction executions, cache misses, and load/store operations in a core;

detecting a cache miss by the first prioritized thread during execution of the first prioritized thread after the first barrier is reached by the multiple threads;

retrieving data from a memory that cures the cache miss for the first prioritized thread before retrieving data that cures cache misses for the other threads by applying thread progress based arbitration in the network; and transmitting data from the memory that cures the cache miss for the first prioritized thread to the first core, wherein retrieving and transmitting the data from the memory that cures the cache miss for the first prioritized thread before retrieving data that cures cache misses for the other threads accelerates memory access for the first prioritized thread by applying the thread progress based arbitration.

15. The computer system of claim 14, wherein the network is a Network On Chip (NOC).

16. The computer system of claim 15, wherein each node in the NOC comprises an arbiter, and wherein the arbiter prioritizes requests for memory accesses to a memory controller that is associated with the NOC.

17. The computer system of claim 15, wherein the memory that cures the cache miss for the first prioritized thread is a system memory that supports the NOC.

18. The computer system of claim 14, wherein the method further comprises:

counting the events that are encountered by each of the multiple threads when reaching the first barrier;

storing a first event count of the events that are encountered by each of the multiple threads when reaching the first barrier in an event counter;

in response to the multiple threads reaching the first barrier, storing the first event count, resetting the event counter, and continuing to execute the multiple threads after the first barrier;

counting the events that are encountered by each of the multiple threads before reaching a second barrier that is after the first barrier;

storing a second event count of the events that are encountered by each of the multiple threads before reaching the second barrier in the event counter;

calculating an event ratio between the first event count and the second event count for each of the multiple threads;

identifying a second prioritized thread whose event ratio is greater than event ratios of the other threads;

detecting a cache miss by the second prioritized thread during execution of the second prioritized thread after the first barrier is reached; and retrieving data from the memory that cures the cache miss for the second prioritized thread after the first barrier is reached before retrieving data that cures cache misses for the other threads after the first barrier is reached.

19. The computer system of claim 14, wherein a header in a packet requesting the memory that cures the cache miss for the first prioritized thread includes a thread progress field that describes a quantity of the events that are encountered by the first prioritized thread before reaching the first barrier.

20. The computer system of claim 14, wherein the stored program instructions are provided as a service in a cloud environment.

* * * * *